(12) United States Patent
Sui et al.

(10) Patent No.: US 9,212,774 B2
(45) Date of Patent: Dec. 15, 2015

(54) CONNECTOR FOR FUEL TANK

(75) Inventors: Xiaohui Sui, Tama (JP); Toshio Hattori, Sagamihara (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 909 days.

(21) Appl. No.: 13/502,942

(22) PCT Filed: Oct. 14, 2010

(86) PCT No.: PCT/JP2010/068088
§ 371 (c)(1),
(2), (4) Date: Jul. 16, 2012

(87) PCT Pub. No.: WO2011/049003
PCT Pub. Date: Apr. 28, 2011

(65) Prior Publication Data
US 2013/0187378 A1    Jul. 25, 2013

(30) Foreign Application Priority Data

Oct. 20, 2009  (JP) .................................. 2009-241082

(51) Int. Cl.
| | | |
|---|---|---|
| *F16K 24/04* | (2006.01) | |
| *F16L 47/02* | (2006.01) | |
| *B60K 15/035* | (2006.01) | |
| *F02M 37/00* | (2006.01) | |
| *F16K 24/06* | (2006.01) | |

(Continued)

(52) U.S. Cl.
CPC .............. *F16L 47/02* (2013.01); *B60K 15/035* (2013.01); *F02M 37/0017* (2013.01); *F02M 37/0076* (2013.01); *F16K 24/04* (2013.01); *F16K 24/06* (2013.01); *F16K 27/07* (2013.01); *F16L 47/14* (2013.01); *B60K 2015/03528* (2013.01)

(58) Field of Classification Search
CPC ........ F16L 47/02; F16L 47/14; B60K 15/035; B60K 15/03519; B60K 15/03576; B60K 15/03528; B60K 2015/03528; F02M 37/0017; F02M 37/0076; F16K 24/04; F16K 24/042; F16K 24/06; F16K 27/07
USPC ......................................................... 137/202
See application file for complete search history.

(56) References Cited

U.S. PATENT DOCUMENTS 6,289,915 B1 * 9/2001 Nulman et al. ................. 137/43
6,371,146 B1 * 4/2002 Benjey .............................. 137/2

(Continued)

FOREIGN PATENT DOCUMENTS

| JP | 2002-137642 | 5/2002 |
|---|---|---|
| JP | 2002-160537 | 6/2002 |

(Continued)

*Primary Examiner* — William McCalister
*Assistant Examiner* — Ian Paquette
(74) *Attorney, Agent, or Firm* — Manabu Kanesaka

(57) ABSTRACT

A connector to connect a fluid path to a fuel tank includes a main portion made of a synthetic resin through which a gas produced from fuel hardly passes, and a shell formed outside the main portion and made of a synthetic resin through which the gas passes easier than the main portion and which can be melt-bonded to the outer surface of a fuel tank. The main portion includes a flange part in the outer periphery. The shell has a wall section for a melt-bonding portion which extends around from the top surface side of the flange part and covers the bottom side of the flange part. The undersurface of the flange part is provided with an inclination having the peripheral edge side of the flange part upside thereof.

5 Claims, 3 Drawing Sheets

(51) Int. Cl.
*F16K 27/07* (2006.01)
*F16L 47/14* (2006.01)

(56) References Cited

U.S. PATENT DOCUMENTS

2001/0028939 A1* 10/2001 Muto et al. .................. 428/99
2006/0213553 A1* 9/2006 Mills et al. .................. 137/43
2007/0107779 A1* 5/2007 Brook et al. .................. 137/202
2009/0116899 A1* 5/2009 Hattori et al. ................. 403/270

FOREIGN PATENT DOCUMENTS

| JP | 2005-178529 | 7/2005 |
| JP | 2007-253908 | 10/2007 |
| JP | 2008-105441 | 5/2008 |

* cited by examiner

CONNECTOR FOR FUEL TANK

FIELD OF THE INVENTION

The invention relates to an improved connector, which is attached to a fuel tank for an automobile or a motorcycle or the like by melt-bonding and is used to connect a fluid path to the fuel tank.

BACKGROUND ART

Currently, as a fuel tank for automobiles, a fuel tank made of resin formed of high density polyethylene as the main raw material is frequently used. Thus, a connector made of synthetic resin which can be melt-bonded to the fuel tank is used for connecting the fluid path to such a fuel tank. Because such a fuel tank has its outer layer formed of high density polyethylene, the bonded portion in such a connector is also formed of polyethylene generally. However, because evaporation gas from fuel can easily pass through polyethylene, in this kind of connector, prevention of outflow of such a gas through the bonded portion as much as possible while appropriately assuring connection strength to the fuel tank is a technical problem. (Reference is made to Patent Document 1)

PRIOR ART DOCUMENT

Patent Document

Patent document 1: Japanese Patent Unexamined Publication No. 2007-253908

SUMMARY OF THE INVENTION

The Problem to be Solved by the Invention

It is a main object of this invention to prevent the outflow of a fuel evaporative gas from passing through the melt-bonded portion in this kind of connector as much as possible while appropriately assuring the melt-bonding strength thereof to a resin-made fuel tank.

Means of Solving the Problem

In order to attain the object, in a first aspect of the invention, a connector for a fuel tank is a connector to connect a fluid path to the fuel tank and comprises:

a main portion made of a synthetic resin through which a gas produced from fuel hardly passes, and a shell which is formed in an outer side of the main portion and is made of a synthetic resin through which the gas passes easier than the main portion and can be melt-bonded to the outer surface of the fuel tank, wherein the main portion has a flange part in the outer periphery, the shell has a wall section for a melt-bonding portion, which extends around from the top surface side of the flange part and covers the bottom side of the flange part, and further, the flange part is formed to locate an undersurface thereof downward at a base side located inside more than the peripheral edge of the flange part.

Further, to attain the object, in the second aspect of the invention, the connector for a fuel tank is a connector to connect a fluid path to the fuel tank and comprises:

a main portion made of a synthetic through which a gas produced from fuel hardly passes, and a shell which is formed in the outer side of the main portion and is made of a synthetic resin through which the gas can pass easier than the main portion and can be melt-bonded to the outer surface of a fuel tank, wherein the main portion has a flange part in the outer periphery, the shell has a wall section for the melt-bonding portion which extends around the top surface side of the flange part, and covers the bottom side of the flange part, and further, an undersurface of the flange part is provided with an inclination having the peripheral edge side of the flange part at an upper side of the inclination.

It is best for the wall section for the melt-bonding portion in the shell to be formed so as to approximately locate its undersurface on one virtual plane.

The connector, by melt-bonding using the shell's wall section for the melt-bonding portion, i.e. by solidifying of the wall section for the melt-bonding portion adhered to the outer surface of the fuel tank in a melt-bonded state, and/or by the solidifying of the wall section for the melt-bonding portion which is being thermally melted while being adhered to the outer surface of the fuel tank, is integrally adhered to the fuel tank through the wall section for the melt-bonding portion. Here, it is desirable to thicken the wall thickness of the wall section for the melt-bonding portion to make such an adherence adequate, but because the shell allows a gas produced from fuel to easily pass through, thickening of the wall section for the melt-bonding portion will cause the enlargement of the part passing such a gas. Therefore, from the standpoint of controlling the permeation volume of the gas through the melt-bonded portion, thickening of the wall section for the melt-bonding portion has its own limitation. Because the distance between the main portion and the intermediate layer (a gas barrier layer) formed of a material which does not permeate a gas produced from the fuel in the fuel tank can be decreased, increasing of the molten volume of the wall section for the melt-bonding portion will contribute to the control of the permeation volume of such a gas. However, because the main portion is a portion which does not foresee the melt-bonding to the outer surface of the fuel tank, a simple increase in the molten volume of the wall section for the melt-bonding portion will lead to a reduction in the melt-bonding strength. In the connector according to the first aspect, the undersurface of the base side of the flange part is located lower than the undersurface of the peripheral edge side thereof, and in the connector according to the second aspect, by the inclination of the under surface of the flange part, the distance between the undersurface of the flange part in the connector adhered to the fuel tank as described above and the outer surface of the fuel tank, can be narrowed at any position in the circumferential direction as little as possible in the center side of the aperture which is opened in the fuel tank. Therefore, the adherence portion can be made to allow a gas produced from fuel to hardly pass therethrough. Further, in this manner, by just narrowing as little as possible the distance between the undersurface of the flange part and the outer surface of the fuel tank in the center side of the aperture which is opened in the fuel tank, a sufficient quantity or volume of the wall section for the melt-bonding portion between the undersurface of the flange part and the fuel tank can be assured outside thereof, and a reduction in the melt-bonding strength as mentioned above can be prevented.

Effect of the Invention

A connector according to the invention, while appropriately assuring the melt-bonding strength of the connector to the resin-made fuel tank, can prevent the outflow of the fuel evaporation gas through the deposited portion thereof as little as possible.

BRIEF DESCRIPTION OF THE DRAWINGS

-FIG. 3 is changed partly.

MODES OF CARRYING OUT THE INVENTION

Figure 1:
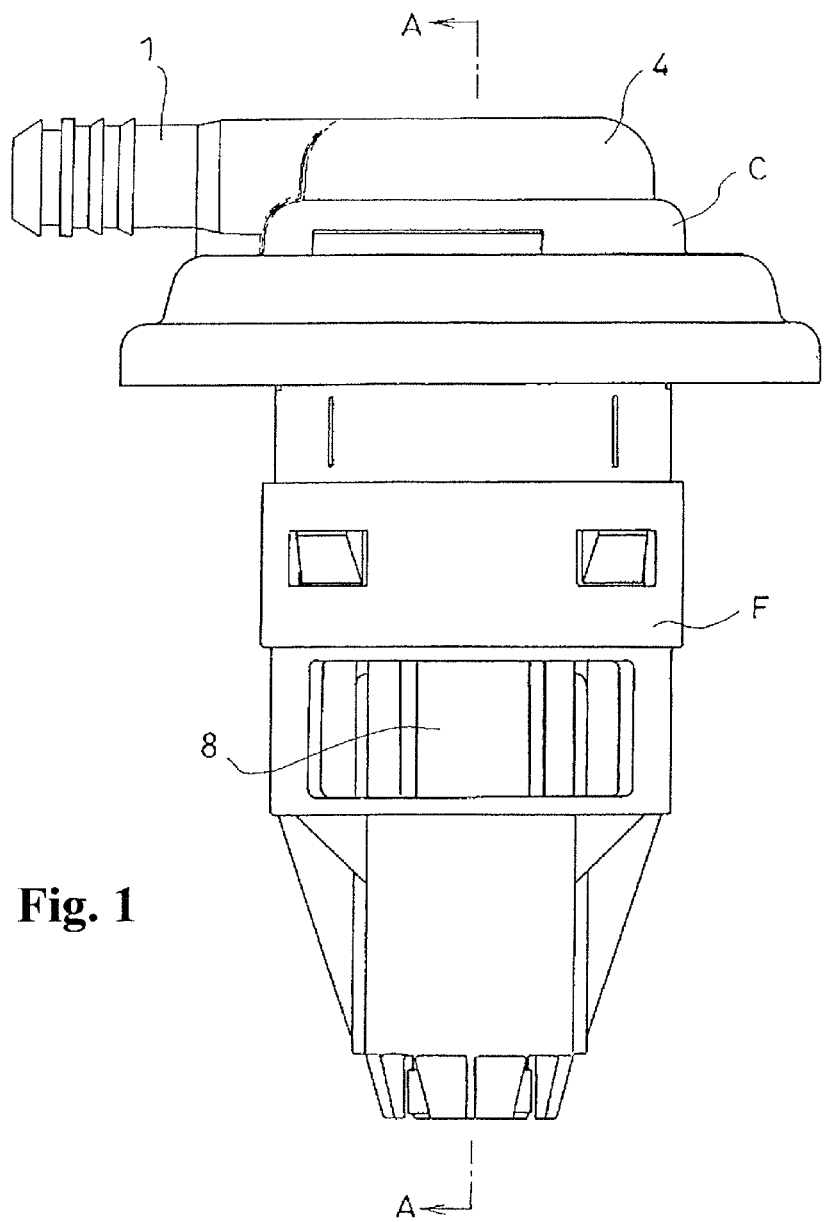
FIG. 1 is a side view of a connector pertaining to an embodiment for carrying out the present invention.
Figure 2:
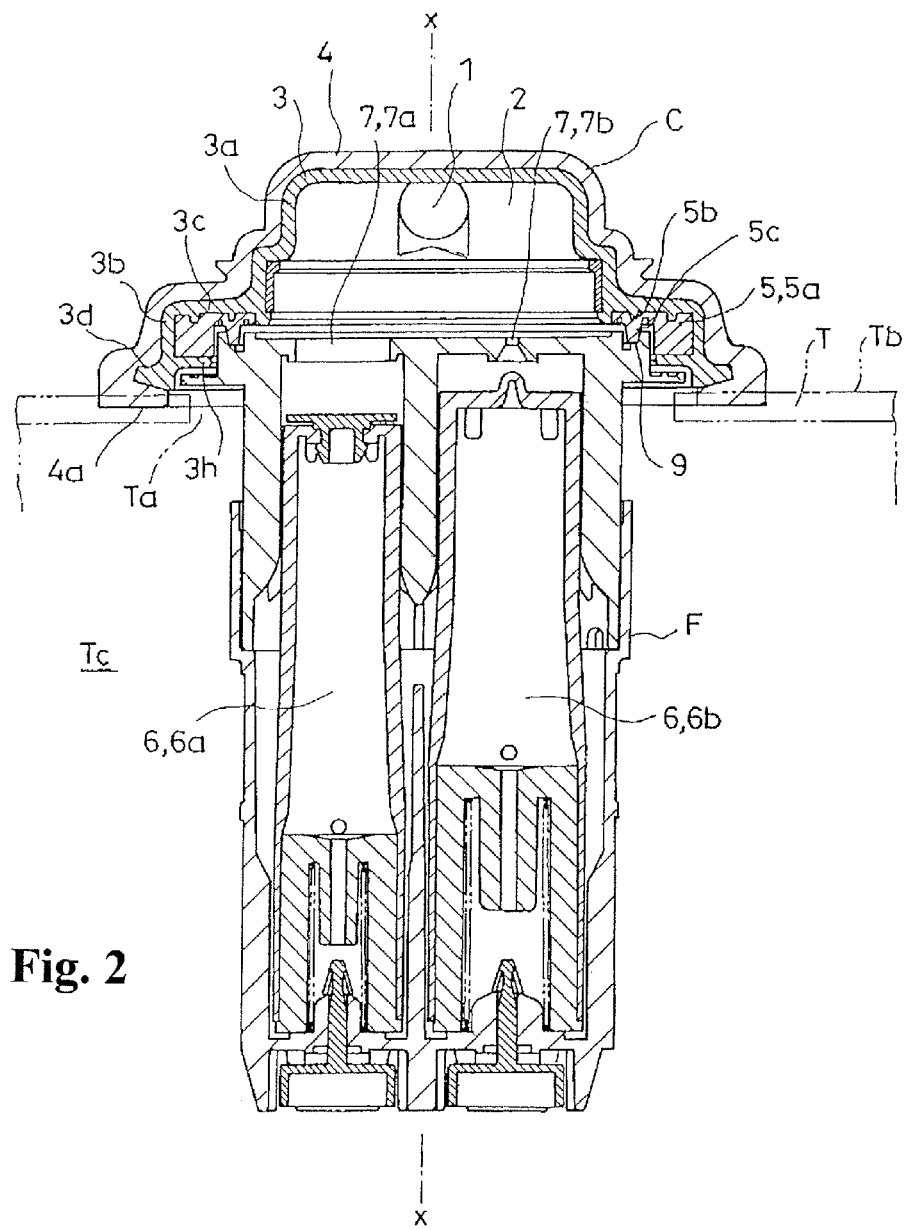
FIG. 2 is a cross sectional view taken along line A-A in FIG. 1, wherein a part of a fuel tank is represented with a phantom line.
Figure 3:
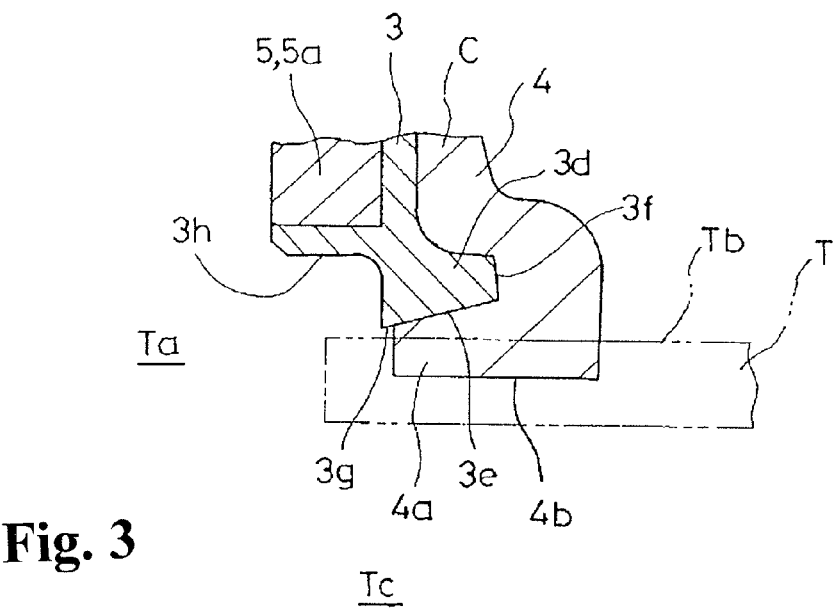
FIG. 3 is an enlarged view of the essential parts of FIG. 2.

Hereinafter, typical examples for carrying out the invention are explained based on FIG. 1 to FIG. 4. A connector for a fuel tank C according to the preferred embodiment of the invention, is attached to a fuel tank T for an automobile or a motorcycle or the like by melt-bonding and is used to connect a fluid path to the fuel tank. That is to say, the connector C connects the fuel tank T to the fluid path through the connector C. The connector C is mounted to the outer surface Tb of fuel tank T in a manner to block an aperture Ta opened in fuel tank T from outside of fuel tank T. The connector C has a connecting portion 1 to the fluid path. And, the fluid path connected to the connecting portion 1 and the inside of fuel tank T communicate through the connector C. Internal and external ventilation of the fuel tank T can thus be secured by the connector C. And alternatively, delivery of fuel out of and into fuel tank T can thus be secured by the connector C. Typically, the connector C can be used to connect an evapo-tube, a breather tube, a filler pipe, a pump unit and the like to the fuel tank T.

In the depicted example, the connector C is configured to present a form of a wooden bowl, and is configured such that the diameter of the opening side (the lower part side) of the wooden bowl is larger than the diameter of aperture Ta opened in fuel tank T. The connector C is mounted to the fuel tank T such that the opening in the form of wooden bowl contacts the outer surface Tb of fuel tank T, and then, the opening in the form of wooden bowl is melt-bonded to the outer surface Tb around the aperture Ta in a state where the aperture Ta is being blocked. In the depicted example, the connector C has a wall section for a melt-bonding portion 4a that can be melt-bonded to the fuel tank T which has its outer surface made up of high density polyethylene.

Further, the connector C has a connecting portion 1 to a tube constituting a ventilation path. In the depicted example, the connecting portion 1 is configured so as to form a tube shape protruding laterally while linking one edge of the tube integrally to the side section of the bottom side (the upper side) of the connector C in the form of wooden bowl. The tube's one end of the connecting portion 1 is communicated with the interior space 2 of the connector C, and by fitting the other edge of the connecting portion 1 into the terminal of the tube which is not illustrated, the tube and fuel tank T are communicated through the connector C.

Further, in the depicted example, a case F which holds a float 6 is mounted to the fuel tank T by the connector C, and the connector C is configured to form part of the float valve device. In the depicted example, the case F forms a tube shape and is provided with a valve port 7 at the top edge, an open section 8 on the side, and a float 6 inside thereof. And, the case F is integrated with the connector C by having its upper part melt-bonded to the connector C as to be hereinafter described. The case F is configured so as to have an appropriate thickness to enter into the fuel tank T from an aperture Ta of the fuel tank T, and is disposed in the top of the fuel tank T by the connector C mounted to the fuel tank T as described above and is located in the inside of fuel tank T. In the depicted example, the valve port 7 comprises a large diameter valve port 7a and a small diameter valve port 7b, and in correspondence therewith, a float 6 comprises a first float 6a located right under the large diameter valve port 7a and a second float 6b located right under the small diameter valve port 7b. When two floats 6a and 6b move downward together, internal and external ventilation of fuel tank T is obtained through an open section 8 and a valve port 7 of the case F and the connecting portion 1. When the liquid level in the fuel tank T rises by refueling and fuel enters into the case F from the open section 8 of the case F, in the depicted example, the first float 6a rises at first, and closes the valve of large diameter valve port 7a. Thereby, when the fuel tank T is filled with a predetermined volume of fuel, internal-pressure of the fuel tank T rises rapidly, to cause the lifting of the liquid level of the fuel in the filler pipe and make the sensor of the refuel gun detect a first/initial full load of fuel therein. When refueling is stopped by the first full load detection, because the valve of the small diameter valve port 7b is open, the internal pressure of the fuel tank T decreases gradually and the first full load detection is deactivated. When the fuel tank T is refueled additionally with additional fuel after the deactivation of this first full load detection, by the rise of the liquid level in the fuel tank T, the second float 6b also rises and the valve of the small diameter valve port 7b is closed and refueling by the refueling gun is stopped finally. Further, in the depicted example, when fuel is consumed and the liquid level in the fuel tank T decreases, the second float 6 moves downward at first, the valve of the small diameter valve port 7b is opened, the first float 6 moves down subsequently by the internal-pressure reduction and thereby, the valve of the large diameter valve port 7a is also opened.

The connector C comprises a main portion which is made of a synthetic resin through which a gas produced from fuel hardly passes and the shell 4 which is formed outside the main portion 3 and is made of a synthetic resin which allows the gas to pass therethrough easier than the main portion 3 and can be melt-bonded to the outer surface Tb of fuel tank T.

In the depicted example, the main portion 3 further has a ring body 5 in its inside, and the main portion 3 is insert molded with this ring body 5 as an insert product.

In the depicted example, the ring body 5 is made of the same synthetic resin as that of the case F. Typically, the ring body 5 and the case F are made of polyacetal. The shell 4 is insert-molded with the main portion 3 as the insert product. The shell 4 is typically made of high density polyethylene from the standpoint of improving the melt-bonding ability with respect to the outer surface Tb of the fuel tank T. From the standpoint of improving integration with the shell 4, the main portion 3 is made of a polymer-alloy of a synthetic resin through which the gas produced from fuel hardly passes and a synthetic resin forming the shell 4. Typically, the main portion 3 is made of a polymer-alloy of polyethylene and polyamide.

The main portion 3 is configured to have a form of a wooden bowl comprising the connecting portion 1. The main portion 3 makes the upper part as a bottom of the wooden bowl, the lower part as the opening of the wooden bowl, the portion from the bottom of the wooden bowl to the position at the middle in up-and-down direction as the small diameter portion 3a, the portion from the position at the middle in the up-and-down direction to the opening of the wooden bowl as the large diameter portion 3b, and between the small diameter portion 3a and the large diameter portion 3b, there is formed a surrounding step surface 3c which faces downward. The connecting portion 1 is communicated with the small diameter portion 3a. In the bottom edge of the large diameter portion 3b or the opening of the wooden bowl of the main portion 3, there is formed a flange part 3d which protrudes outwardly around the entire periphery. Thereby, the main portion 3 has the flange part 3d in the outer periphery. Further, in the bottom edge side of the large diameter portion 3b, there is provided an inner flange section 3h which protrudes inwardly.

In the depicted example, the ring body 5 comprises a ring base 5a having a thickness approximately equal to the distance between the surrounding step surface 3c and the flange section 3h in the main portion 3 and the ring fin section 5b which projects continuously into the inside of the ring base 5a on the top surface of the ring base 5a. The main portion 3 is insert-molded with the ring body 5 as the insert product such that the top surfaces of the ring base 5a and the ring fin section 5b contact the surrounding step surface 3c of the main portion 3; the lateral surface of the ring base 5a contacts the internal surface of large diameter portion 3b; and the undersurface of the ring base 5a contacts the top surface of the inner flange section 3h. The ring fin section 5b of the ring body 5 has a surrounding protrusion 5c which protrudes downwardly. In the depicted example, the surrounding groove 9 which holds the surrounding protrusion 5c is formed in the top portion of the case F, and by holding the surrounding protrusion 5c in the surrounding groove 9 and melt-bonding both together by spin melt-bonding and the like, the case F is made to be installed integrally with the connector C.

The shell 4 covers the whole of the outer surface of the main portion 3 which presents a form of wooden bowl, and the undersurface 3e side of the flange part 3d of the main portion 3.

That is to say, the shell 4 has a wall section for the melt-bonding 4a portion, which extends around from the top surface side of the flange part 3d and covers the undersurface 3e side of this flange part 3d. In the depicted example, the wall section for the melt-bonding 4a covers the undersurface 3e of the flange part 3d from its peripheral edge 3f, while leaving a part 3g of the base side of the flange part 3d behind. Further, the wall section for the melt-bonding 4a in the shell 4 is formed so as to approximately locate its undersurface on an imaginary plane. That is to say, the surrounding wall section for the melt-bonding 4a covering the outer surface of the flange part 3d of the surrounding main portion 3 forms its undersurface 4b, at any position in the circumferential direction, in the depicted example, as a lateral surface at right angles to the central axis x of the aperture Ta opened in the fuel tank T.

On the other hand, the undersurface 3e of the flange part 3d is provided with an inclination having the peripheral edge 3f side of the flange part 3d at an upside. That is to say, the distance between the undersurface 4b of the wall section for the melt-bonding portion 4a and the undersurface 3e of the flange part 3d, at any position in the circumferential direction, is the smallest in the inside of the connector c, i.e. in the center side of the aperture Ta opened in fuel tank T, and becomes gradually wider toward the outside of the connector C. Thus, the wall thickness of the wall section for the melt-bonding portion 4a also gradually becomes larger toward the outside of the connector C.

The connector C is integrally adhered to the fuel tank T through the melt-bonding portion 4a, by the melt-bonding using the shell 4's wall section for the melt-bonding portion 4a or by solidifying of the wall section for the melt-bonding portion 4a adhered to the outer surface Tb of fuel tank T in a thermally melted state, or by solidifying of the wall section for the melt-bonding portion 4a which is being thermally melted while being adhered to the outer surface Tb of the fuel tank T. Here, it is desirable to thicken the wall thickness of the wall section for the melt-bonding portion 4a to make such an adherence adequate, but because the shell 4 easily allows a gas produced from fuel to pass therethrough, thickening the wall section for the melt-bonding portion 4a will cause the enlargement of the part passing such a gas. Therefore, from the standpoint of controlling the permeation volume of the gas through the deposited portion, thickening of the wall section for the melt-bonding portion 4a has its own limitations. Because the distance between the main portion 3 and the intermediate layer (a gas barrier layer) formed of a material which does not pass a gas produced from fuel in fuel tank T, can be decreased, increasing the molten volume of the wall section for the melt-bonding portion 4a will contribute to the controlling of the permeation volume of such a gas. (In this case, the volume of gas escaping laterally from the undersurface 3e of the flange part 3d of the main portion 3 in the wall section for melting (which is being melted) increases.) Because the main portion 3 has a portion which is not intended to melt-bond to the outer surface Tb of the fuel tank T, a simple increase in the molten volume of the wall section for the melt-bonding portion 4a will lead to a reduction in the melt-bonding strength. In the connector C, by the inclination of the undersurface 3e of the flange part 3d, the distance between the undersurface 3e of the flange part 3d of the connector C adhered to the fuel tank T as described above and the outer surface Tb of the fuel tank T can, at any position in the circumferential direction, is narrowed as little as possible in the center side of aperture Ta which is opened to the fuel tank T. Thus, the adherence portion can be made such that the gas produced from fuel hardly passes therethrough. Further, in this manner, even by just narrowing as little as possible the distance between the undersurface 3e of the flange part 3d and the outer surface Tb of the fuel tank T in the center side of the aperture Ta which is opened to the fuel tank T, a sufficient quantity or volume of the wall section for the melt-bonding portion 4a between the undersurface 3e of the flange part 3d and the fuel tank T outside thereof can be obtained, and a reduction in the melt-bonding strength as mentioned above can be prevented.

Further, in the depicted example, the flange part 3d of the main portion 3 has an inclination such that as it comes close to the peripheral edge 3f, it approaches the bottom of connector C which presents a form of wooden bowl. When forming the molding shell 4 with the main portion 3 as the insert product, if the gate of a synthetic resin forming the shell 4 is provided in the bottom side of the connector C which presents a form of wooden bowl, by the synthetic resin which is fed forcibly from the bottom side to the opening side of connector C, even when the flange part 3d is slightly deformed to some extent, the inclination of the undersurface 3e of the flange part 3d is not lost. Further, the synthetic resin which is fed forcibly in this way smoothly enters, beyond the peripheral edge 3f of the flange part 3d, into the portion covering the undersurface 3e by the inclination of the undersurface 3e of the flange part 3d.

Figure 4:
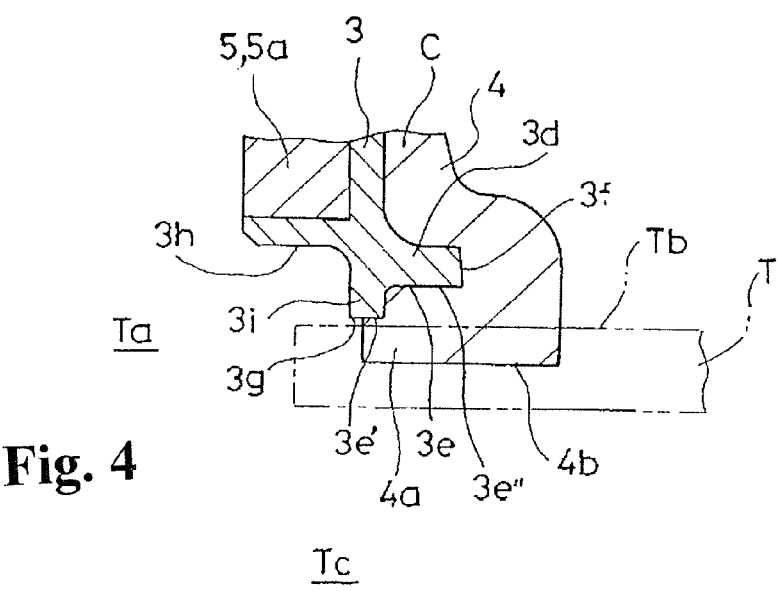
FIG. 4 shows an example, in which the configuration of the flange part of the main portion of the connector shown in FIG. 1

FIG. 4 shows an example, wherein the undersurface 3e' of the base side of the flange part 3d is located below the undersurface 3e" of the peripheral edge 3f side, in the connector C which is adhered to the fuel tank T as described above, the distance between the undersurface 3e of the flange part 3d and the outer surface Tb of the fuel tank T, can, at any position in the circumferential direction, be narrowed as little as possible in the center side of the aperture Ta which is opened in the fuel tank T. In the example shown in FIG. 4, the surrounding rib 3*i* protruding downward is formed in the base side (the basic side of the flange part 3*d* inside of the peripheral edge 3*f*) of flange part 3*d*, and the protrusion edge of the surrounding rib 3*i*, i.e. undersurface 3*e*' of the base side of flange part 3*d*, is located below the under surface 3*e*" of the peripheral edge 3*f* side of the flange part 3*d*. In the example shown in FIG. 4, the portion of the undersurface 3*e* of the flange part 3*d* from the peripheral edge 3*f* to the base is not slanted and forms a lateral surface at right angles to the central axis x of the aperture Ta opened in the fuel tank T. The wall section for the melt-bonding portion 4*a* of the shell 4 covers the undersurface 3*e* of the flange part 3*d* from the peripheral edge 3*f* to the protrusion edge of the surrounding rib 3*i*.

The entire disclosure of Japanese Patent Application No. 2009-241082 filed on Oct. 20, 2009 including the specification, claims, drawings and summary is incorporated herein by reference in its entirety.

What is claimed is:

1. A connector to connect a fluid path to a fuel tank, comprising;
    a main portion made of a first synthetic resin through which a gas produced from fuel hardly passes, and including an upper part and a lower part to form a bowl shape, the upper part being formed as a bottom of the bowl shape and the lower part being formed as an opening of the bowl shape, and a flange part protruding annularly outwardly from an outer periphery of the lower part and having a flange undersurface inclining upwardly from an inner periphery of the lower part toward a peripheral edge thereof, and
    a shell formed outside the main portion and made of a second synthetic resin through which the gas passes easier than the first synthetic resin, the shell including a wall section extending around the flange part to cover from a top surface side of the flange part to the flange undersurface and having a wall section undersurface melt-bonding to an outer surface of the fuel tank,
    wherein
    the shell has a distance between the flange undersurface and the wall section undersurface gradually wider from an inside of the connector toward an outside thereof, and
    the shell is insert-molded with the main portion as an insert product.

2. The connector to connect a fluid path to a fuel tank according to claim 1, wherein the wall section in the shell is formed so as to substantially locate the wall section undersurface on an imaginary plane.

3. The connector to connect a fluid path to a fuel tank according to claim 1, wherein the inner periphery of the lower part of the main portion is located on an inner position relative to an inner periphery of the wall section so that a part of the flange undersurface is exposed.

4. The connector to connect a fluid path to a fuel tank according to claim 3, further comprising a ring body arranged inside the main portion,
    wherein the main portion further comprises a surrounding step surface portion formed between the upper part and the lower part to face downward and an inner flange section protruding inwardly from the inner periphery of the lower part, and
    the ring body is arranged between the surrounding step surface and the inner flange section.

5. The connector to connect a fluid path to a fuel tank according to claim 4, wherein the ring body includes a ring base having a thickness substantially equal to a distance between the surrounding step surface and the flange section, a ring fin section projecting inwardly from the ring base, and a surrounding protrusion protruding downwardly from the ring fin section to connect a case mounted to the fuel tank.

* * * * *